(12) United States Patent
Pereira

(10) Patent No.: US 9,088,350 B2
(45) Date of Patent: Jul. 21, 2015

(54) SYSTEM AND METHOD FOR SELECTING PARAMETERS FOR COMPRESSING COEFFICIENTS FOR NODESCALE VECTORING

(75) Inventor: Stephanie F. Pereira, Santa Clara, CA (US)

(73) Assignee: IKANOS COMMUNICATIONS, INC., Fremont, CA (US)

( * ) Notice: Subject to any disclaimer, the term of this patent is extended or adjusted under 35 U.S.C. 154(b) by 108 days.

(21) Appl. No.: 13/552,554

(22) Filed: Jul. 18, 2012

(65) Prior Publication Data

US 2014/0023127 A1    Jan. 23, 2014

(51) Int. Cl.
- *H04B 17/00* (2006.01)
- *H04B 3/32* (2006.01)
- *H04L 1/00* (2006.01)

(52) U.S. Cl.
CPC ............ *H04B 17/00* (2013.01); *H04B 3/32* (2013.01); *H04L 1/00* (2013.01); *H04L 1/0002* (2013.01)

(58) Field of Classification Search
None
See application file for complete search history.

(56) References Cited

U.S. PATENT DOCUMENTS

| | | | |
|---|---|---|---|
| 7,474,628 B2 * | 1/2009 | Itoh | 370/252 |
| 2006/0274893 A1 | 12/2006 | Cioffi et al. | |
| 2006/0280236 A1 | 12/2006 | Rhee et al. | |
| 2009/0245340 A1 * | 10/2009 | Sorbara et al. | 375/227 |
| 2010/0195816 A1 * | 8/2010 | Ahrndt et al. | 379/406.06 |
| 2011/0110409 A1 | 5/2011 | Sands et al. | |
| 2012/0020418 A1 | 1/2012 | Sands et al. | |
| 2012/0027060 A1 | 2/2012 | Singh et al. | |
| 2012/0106605 A1 * | 5/2012 | Ashikhmin et al. | 375/222 |
| 2012/0236915 A1 * | 9/2012 | Nuzman | 375/224 |

FOREIGN PATENT DOCUMENTS

WO    WO 2010075559 A1 *   7/2010 ............... H04B 1/10

OTHER PUBLICATIONS

International Search Report and Written Opinion issued Oct. 24, 2013 for PCT/US2013/051103.

* cited by examiner

*Primary Examiner* — Ian N Moore
*Assistant Examiner* — Latresa McCallum
(74) *Attorney, Agent, or Firm* — Pillsbury Winthrop Shaw Pittman LLP

(57) ABSTRACT

In general, the present invention relates to methods and systems for optimizing the precoder coefficient compression parameters for reducing the storage and other demands on a vectored DSL system. Embodiments of the invention can be implemented in conjunction with various existing coefficient compression techniques such as quantization of coefficients and decimation in frequencies. According to certain aspects, the compression parameters (e.g. Golomb modulus and quantization level) are selected for each of a plurality of macrobands so as to optimize the overall data rate of the system for any given channel condition. According to further aspects, the compression parameters are computed to ensure that the compressed coefficients for all macrobands do not exceed the available memory allocated for storing the coefficient data.

20 Claims, 4 Drawing Sheets

SYSTEM AND METHOD FOR SELECTING PARAMETERS FOR COMPRESSING COEFFICIENTS FOR NODESCALE VECTORING

FIELD OF THE INVENTION

The present invention relates generally to the field of vectored DSL communication systems.

BACKGROUND OF THE INVENTION

Digital Subscriber Line (DSL) communications suffer from various forms of interference, including crosstalk. Various techniques have been developed to combat this interference and its effects on data transmission, including vectored DSL. The amount of vectoring-related data that must be transmitted between downstream and upstream modems is substantial for vectored DSL systems; vectoring data relating to crosstalk also must be stored, updated, manipulated and/or processed by upstream devices such as vectoring control entities and/or other vectoring modules.

Vectoring mitigates crosstalk inherent in twisted-pair DSL networks by cancelling or pre-cancelling crosstalk (i.e. FEXT) interference in the signals of a vectored group of co-located transceivers. The crosstalk from and into every transceiver is described as a matrix (channel matrix) for every tone (frequency) used by the individual transceivers. To perform cancellation, the vector processing system must have access to the signals from and to each transceiver participating in a vectored group, and cancellation information is embodied in coefficients that describe the inverse (or approximate inverse) of the channel matrix. Because the number of coefficients increases as the square of the number of DSL lines in a vectored group, and because earlier systems have stored coefficients for each unit and frequency as fixed size numbers, memory requirements in vectored systems increase rapidly with larger vectored groups.

Certain conventional approaches for addressing these demands in vectored systems exist. One approach is called partial cancellation. Partial cancellation techniques include line selection (i.e. retaining coefficients for only the dominant disturber DSL lines) and tone selection (i.e. retaining coefficients for only the dominant disturbing tones), but both of these methods require supervision (e.g., supervising software, firmware) to monitor tones and/or lines being cancelled. Since network characteristics and operating conditions change over time, these monitoring functions must be maintained as the conditions change. Moreover, partial cancellation, by definition, causes performance on non-cancelled channels to suffer.

Commonly owned application Ser. Nos. 13/002,213 and 13/189,095, the contents of which are incorporated herein by reference in their entireties, describe various useful and valuable techniques for reducing memory, transfer and processing demands on a vectored DSL system, and which can be implemented to manage precoder coefficients for all available victims, disturbers and tones (i.e. nodescale vectoring). However, opportunities for further improvement remain.

SUMMARY OF THE INVENTION

In general, the present invention relates to methods and systems for optimizing the precoder coefficient compression parameters for reducing the storage and other demands on a vectored DSL system. Embodiments of the invention can be implemented in conjunction with various coefficient compression techniques disclosed in the co-pending applications. According to certain aspects, the compression parameters (e.g. Golomb modulus and quantization level) are selected for each macroband so as to optimize the overall data rate of the system for any given channel condition. According to further aspects, the compression parameters are computed to ensure that the compressed coefficients for all macrobands do not exceed the available memory allocated for storing the coefficient data. Embodiments of the invention provide a way to precompute optimal compression parameters for a plurality of channel conditions and store the parameters in a lookup table whose size can easily fit in memories used by conventional VCE chips.

In furtherance of these and other aspects, a method for optimizing coefficient data for a vectored DSL system according to embodiments of the invention includes identifying a plurality of macrobands in the vectored DSL system; selecting respective coefficient data compression parameters for each of the macrobands; evaluating performance of the vectored DSL system with the selected coefficient data compression parameters; and optimizing the selecting of the respective coefficient data compression parameters in accordance with a desired system performance as determined by the evaluating.

In additional furtherance of these and other aspects, a vectored DSL system according to embodiments of the invention includes a VCE; and one or more processors configured for optimizing coefficient data for the vectored DSL system, the optimizing comprising: identifying a plurality of macrobands in the vectored DSL system; selecting respective coefficient data compression parameters for each of the macrobands; evaluating performance of the vectored DSL system with the selected coefficient data compression parameters; and optimizing the selecting of the respective coefficient data compression parameters in accordance with a desired system performance as determined by the evaluating.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

Figure 1:
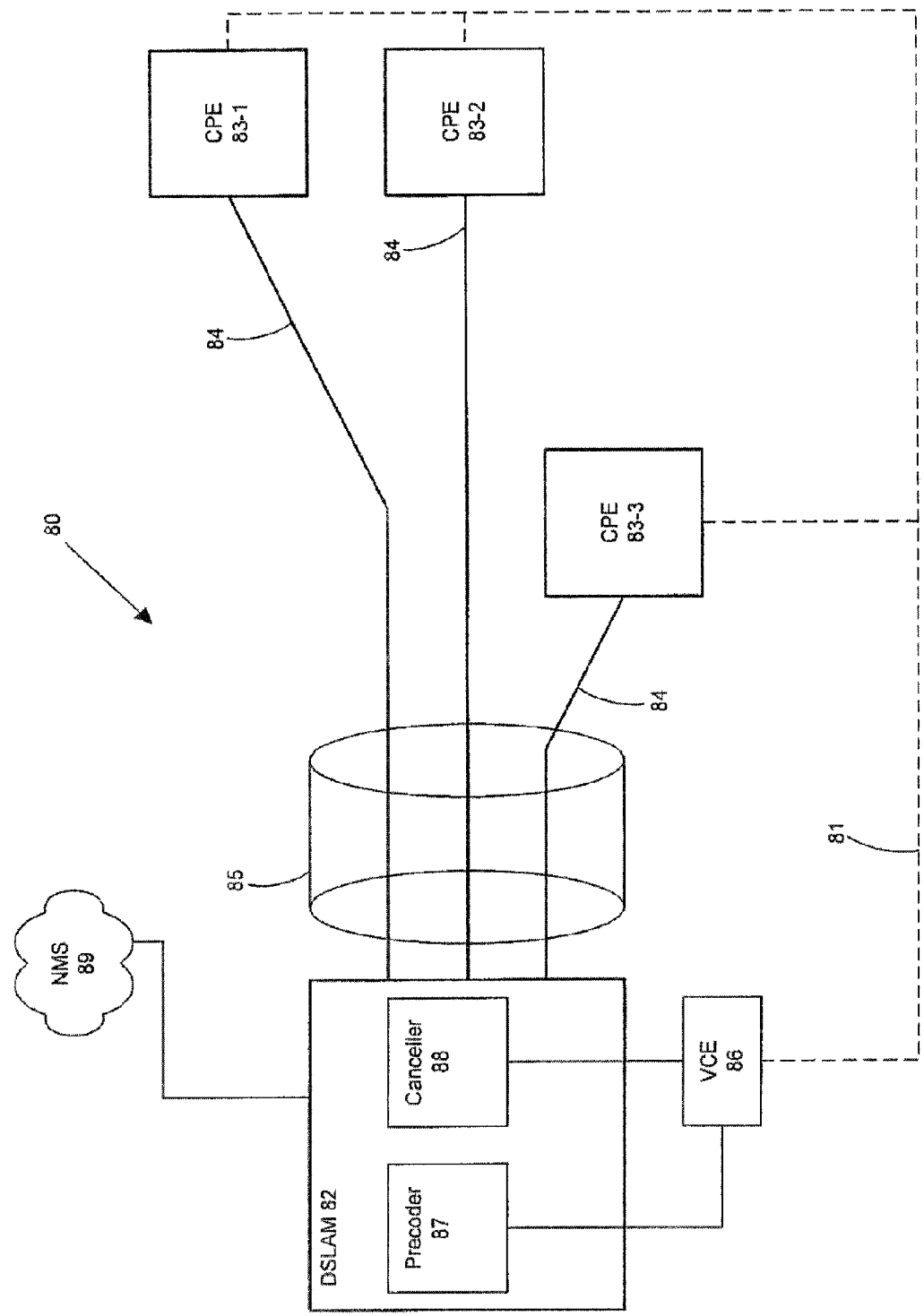
FIG. 1 is a (MIMO) DSL system in which embodiments of the present invention can be implemented.

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

In general, embodiments of the invention enable improved performance in vectored digital subscriber line (DSL) systems.

In the absence of crosstalk, the existing copper telephone infrastructure can in theory be utilized to carry from tens to hundreds of megabits per second over distances up to approximately 5,000 feet using discrete multitone (DMT) DSL modem technology. DMT modems divide the available bandwidth into many sub-carriers (also referred to as "tones," "frequencies" and/or "bins") that are synchronized and independently modulated with digital QAM data to form an aggregate communication channel between the network and subscriber. DMT-based DSL systems typically use Frequency Division Multiplexing (FDM) and assign particular sub-carriers to either downstream (that is, from DSLAM/CO to CPE/user) or upstream (from CPE/user to DSLAM/CO) directions. This FDM strategy limits near end crosstalk (NEXT). DMT systems are typically very robust in the presence of radio frequency interference (RFI) and other types of frequency-selective noise (or interference) or channel dispersion, because each sub-carrier can be independently modulated with an appropriate amount of data and power in order to meet the system requirements and the desired bit error rate.

Typical telephone binder cables typically contain between 10 and 50 unshielded copper twisted pairs (these binders are then bundled into larger cables). Due to variations in manufacturing and imperfect cable installation (for example, bending, etc.), significant levels of FEXT occur between each twisted pair within a binder (and between adjacent binders), as is well known to those skilled in the art. As a result of typical cable construction, installation and deployment techniques, each twisted pair is physically adjacent to many other twisted pairs in (or outside) its binder for a significant distance in the cable. While there is variation in the FEXT levels as a result of manufacturing variation, the net result is that every copper pair imparts some amount of FEXT onto virtually every other copper pair in the cable. In many instances, the FEXT can be as much as or more than 40 dB higher than the background noise level on the line and the crosstalk typically increases with frequency. Cable measurements have shown that each particular line has at least, and often more than, 5 to 10 disturbers that impact the line's performance. As a result, FEXT is the dominant impairment in reaching high data rates in DMT DSL systems on relatively short loops.

As a result of typical cable construction, installation and deployment techniques, FEXT is the dominant impairment in reaching high data rates in DMT DSL systems on many loops. Advanced signal processing termed "vectoring" partially or completely cancels FEXT between twisted pairs within copper telephone cables and permit dramatically higher data rates. Vectoring coordinates communications between DSL lines in a telephone cable, which all terminate in a central location known as a DSLAM (DSL access multiplexer). To vector DSL modems effectively, they must be synchronized to the same DMT symbol clock and have synchronized training/tracking periods with pre-arranged training data patterns (unique to each modem) to allow victim modems to identify crosstalk characteristics between particular pairs of disturber-victim modems. As will be appreciated by those skilled in the art, there are a variety of techniques for identifying crosstalk in such systems, including one or more that may be described in various applicable standards pertaining to DSL systems and their implementation.

"Crosstalk topography" or mapping typically is expressed as a matrix of the various interactive/crosstalking relationships between DSL lines determined during training, tracking and the like. Pre-compensation (e.g., precoding) is used in the downstream direction (e.g., from a DSLAM to a customer site) and pre-distorts a modem's transmit waveform using other modems' transmit waveforms (i.e., modems whose FEXT affects the given modem's signals), such that interfering FEXT is counteracted and its effects eliminated or reduced when the pre-distorted modem signal reaches its customer side modem. In the upstream direction (e.g., from customer site to DSLAM), MIMO (multiple-input-multiple-output) spatial filtering at the DSLAM cancels upstream FEXT at the upstream receive side. Cancellation coefficients can be identified and updated using LMS (Least Mean Squares) adaptive algorithms or other Least-Squares type methods, as is well known.

Embodiments of reduced memory DSL disclosed and claimed herein utilize techniques and apparatus to reduce "vectoring data" (or "FEXT data" or the like) storage, transfer and processing demands in vectored DSL systems (e.g., storing, transmitting and/or processing received error signals or other signals that are proxies for FEXT on a given DSL line, FEXT compensation filter coefficients, FEXT channel estimates or coefficients, a FEXT compensation matrix G, back-channel communication signals conveying such information, etc.). FEXT coupling information is derived from DSL modems' measurements during initialization and training. In some embodiments described herein FEXT coupling is estimated for only a subset of tones and FEXT is then canceled for all used tones by reconstructing, estimating, etc. coefficients. Some embodiments involve information loss, resulting in a discrepancy between ideal and reconstructed coefficients; such reconstruction error appears as uncancelled or residual FEXT and combines with background noise in a receiver. Bit allocation (typically limited to 15 bits/tone) limits the Signal-to-Noise Ratio (SNR) needed to support reliable communication. Also, unavoidable signal attenuation in twisted pairs increases with frequency, so the allowable residual FEXT level (i.e., the amount of FEXT that causes minor enough degradation that no benefit is gained by further residual FEXT suppression) varies with tone frequency. Use of quantization in embodiments herein thus varies as a function of tone frequency; the set of quantization intervals being derived in some embodiments by examining overall data rate objectives for the complete vectored DSL system.

The present inventor recognizes that, for a given victim/disturber pair, FEXT coupling is strongly correlated over frequency. This correlation can be embodied as a linear prediction filter, so FEXT coupling information at some frequencies is used to predict coupling at other frequencies. If the prediction error is computed, the variance of this prediction error is small compared to the variance of the FEXT coupling itself, so FEXT coupling information at a starting tone, used with the prediction error sequence over a large set of tones, is sufficient to capture the FEXT coupling for a large set of tones. Memory storage, transmission and processing demands required for such information is therefore less than that for the FEXT coupling for the set of tones. To reconstruct the FEXT coefficients at every tone in such embodiments, the error sequence is processed with the inverse of the linear prediction filter, together with the starting state, for example in a prediction filter using the first order difference in which the coefficient value at the previous tone is subtracted from the value at the current tone. In other embodiments, a linear transform such as the Discrete Cosine Transform transforms the set of available estimates of the FEXT coupling. The strong correlation in the estimates of the FEXT coupling means that many values of the transformed estimates will be small and can be discarded with minimal loss in fidelity. An adjustable threshold can be used to select those transform values to be retained. Thus fewer quantities remain to store, transmit and process in vectored DSL systems. After one or more of the preceding approaches have been applied, the resulting sequence is composed of symbols (numbers) with non-uniform frequency of occurrence. Some embodiments then apply (lossless) variable-length entropy coding to further reduce memory storage, transmission and processing demands (e.g., arithmetic coding, Huffman coding and Golomb coding, which involve assigning symbols to codewords having lengths inversely proportional to the frequency of the symbols' occurrences—memory, bandwidth and/or processing advantages accrue because more frequent symbols are assigned to short codewords.

To be an effective FEXT canceller or precoder, coefficients should reflect the apparent state (as perceived by the modem) of the physical loop plant, which can vary with time. To accomplish this, channel measurements are made from time to time using special symbols, and additive updates to the coefficients are computed (updates are added to previous coefficients to create new coefficients for given disturber/victim pairs and tone frequencies). Because both the prediction filter and transform methods are linear, the prediction filter or transform is applied to the update to simplify implementation, after which the filtered or transformed update is added to the previous set of coefficients. The use of variable-length coding complicates the updating process, because the result of the update may have different storage requirements (e.g., the new set of coefficients may be too large to fit in available memory). To protect the system against overflow, embodiments of reduced memory vectored DSL herein can use adjustable parameters that control the fidelity and memory size to that the system starts with a parameter combination that guarantees that the coefficients fit in available memory, and that subsequent iterations will refine the set of coefficients until a pre-determined limit is reached.

Embodiments of reduced-memory vectored DSL thus yield (1) a vectored DSL system having a reduced bandwidth burden for data transmissions from CPE side FEXT data collectors to DSLAMs, and/or (2) a vectored DSL system with reduced DSLAM data storage, transmission and processing requirements for FEXT cancellation data (e.g., for accessing FEXT data for processing within a DSLAM or the like).

A "full" FEXT cancellation scheme (cancelling all FEXT for all disturbers on all frequencies) for a vectored group having U users requires computations of the order $U^2$ per DMT symbol period. In a DSL system with nearly 4,096 tones and with only 10 vectored users, the complexity level for "full" FEXT cancellation is on the order of billions of floating point operations (i.e. flops) per second and power dissipation in FEXT mitigation devices is proportional to the complexity of the FEXT mitigation algorithm. Those skilled in the art will appreciate that such a degree of complexity involved in any full FEXT cancellation is thus presently impractical. Moreover, perfect cancellation in such systems is unlikely due to imperfections in generating and updating cancellation coefficients and in processing techniques used in such systems.

FIG. 1 illustrates an exemplary vectored group DSL system 80 (e.g., VDSL, VDSL2, ADSL, etc.) in which embodiments of reduced-memory vectored DSL can be implemented, system 80 comprising an upstream-end DSL device (e.g., CO side DSLAM 82) and a plurality of U downstream-end DSL devices (e.g., CPEs 83) coupled to DSLAM 82 via twisted pairs 84, which are bundled in binder 85. DSLAM 82 includes a crosstalk precoder 87 and a crosstalk canceller 88 coupled to lines 84. A vectoring control entity (VCE) 86 is coupled to precoder 87 and canceller 88, and coupled to CPEs 83 via one or more channels 81 (channels 81 between CPEs 83 and VCE 86 may be upstream logical data paths from CPEs 83 to DSLAM 82 and may not be physically separate from lines 84). Other configurations of the canceller 88, precoder 87 and VCE 86 are known and can be used in various embodiments. CPEs 83 transmit FEXT cancellation data (e.g., error signals, quantized data, etc.) via channels 81 to the DSLAM 82, which extracts and sends the error feedback signals to VCE 86. DSLAM 82 may optionally be coupled to a network management system (NMS) 89, that can be a network management structure that processes data exchanged with DSLAM 82. In other embodiments, DSLAM 82 can be modified to include splitters, filters, management entities, and various other hardware, software, and functionalities. DSLAM 82 comprises a plurality of DSL transceivers (e.g. VTU-Os) that exchange signals between the VCE 86, canceller 88, precoder 87, NMS 89, and/or lines 84. DSL signals are received and transmitted using the DSL transceivers, which can be modems, modem cards, line cards, etc. CPEs 83 each comprise a DSL transceiver (e.g. a VTU-R) to transmit data to DSLAM 82 via a line 84. A variety of other upstream-end and downstream-end configurations and DSL devices can be used and the exemplary configuration of FIG. 1 is not limiting, as will be appreciated by those skilled in the art.

Precoder 87 pre-cancels crosstalk in downstream DSL transmissions using partial crosstalk cancellation to reduce downstream signal crosstalk noise, e.g. using a typical DSL system band plan with a number of downstream and upstream bands that can be used with embodiments of reduced-memory vectored DSL herein. A MIMO system like FIG. 1 can be characterized by system (or channel) responses from each input to each output of the system. For linear systems, the system responses are linear functions. For example, inputs 1 through U and outputs 1 through U have system responses $H_{ij}$ (FEXT channel responses/coefficients for i≠j, and direct channel responses/coefficients for i=j), namely $H_{11}$, $H_{12}$, ..., $H_{1U}$, $H_{21}$, ..., $H_{U1}$, $H_{U2}$, ..., $H_{UU}$. Any given Output$_u$ is thus the aggregate response from every input (1 to U) to that output. To identify system responses, with (i,j=1: U), inputs can be stimulated with test signal input data (e.g., pilot and/or orthogonal training or tracking sequences) and the test signal output data of the system received, observed, measured and/or collected by CPE modems (i.e., downstream-end DSL devices). Data received or computed by a receiving modem is typically an error signal. Each modem knows what the training/tracking data inputs are and what output signal the modem should receive if no crosstalk is present. The receiving modem calculates an error signal representative of the difference between the expected transmission output and the actual (FEXT-perturbed) transmission output. These error signals can be sent to a DSLAM or the like as an indication of a given DSL line's FEXT interference. The DSLAM collects these error signals from all of the relevant CPE modems and correlates the data to determine the $H_{ij}(k)$ coefficients that represent crosstalk effects in the relevant DSL lines.

Thus, each sub-channel becomes an independent MIMO system whose channel response can be independently (and simultaneously) identified. Direct system responses, $H'_{ii}$, correspond to desired modem response signals for a single sub-channel from each modem's own twisted pair and the remaining terms; $H_{ij}$, where $i \neq j$ correspond to FEXT from other lines in the same or a different cable. Such a system exists in both upstream and downstream directions where tone groups are assigned to either transmission direction. Various embodiments of reduced-memory vectored DSL are described herein in connection with a DSLAM coupled to a number of CPE modems. However, as appreciated by those skilled in the art, other embodiments can be used in other DSL transmission and vectoring settings and structures. For example, a DSL line may couple a DSLAM to an intermediate DSL line device such as an optical networking terminus (ONT), a signal repeater, etc. Likewise, the upstream end of a DSL line might terminate with a device or apparatus other than a DSLAM. That is, embodiments of the present invention can be used in a variety of DSL settings in which the DSL line terminates with a downstream transceiver and an upstream transceiver.

Previous DSLAM-side vectoring systems performed transmit pre-coding by each CPE modem measuring/collecting FEXT responses for all tones in the DMT system (based, e.g., on training data transmitted from a telco side device) and sent each tone's collected measurement to the telco/DSLAM side device (over a back-channel) for FEXT channel estimation and further processing. As is known to those skilled in the art, each value sent to the DSLAM by the CPE after crosstalk training can be a proxy for $H_{ij}$, rather than the value of $H_{ij}$ itself (such variations in commonly used and known notation or quantities is not discussed in detail). Alternatively, CPEs could perform needed FEXT channel estimation processing and send channel estimates to the telco/DSLAM side over the back-channel. Because FEXT channel characteristics can vary over time, these channel estimates typically are tracked and updated regularly over time. In vectored DSL systems, upstream back-channel communication of FEXT data can be a significant bottleneck and subsequent storage of FEXT data can be a substantial memory burden. Back-channel communication of FEXT channel measurements or the like is especially problematic, as only a low bit-rate control channel is available during this preliminary startup period (prior to full modem training and initialization). This communication bottleneck can slow system-training time and postpone useful system operation. Back-channel communication also is a problem during normal system operation, because most DSL frequency band schemes are biased in favor of higher downstream rates at the expense of lower upstream rates (e.g., by a 10:1 ratio). Thus back-channel communication may be a significant part of a total available upstream data rate. If sufficient bandwidth is not allocated for updating FEXT data measurements, updates may be slowed and prevent timely tracking of channel variation. Storage of the FEXT channel data is a related problem. Generally, a system with U users has $U^2$ total channel responses (U desired direct channel responses and U*(U−1) FEXT channel responses) that are calculated and stored for each DMT tone. While some optimization techniques reduce the burden, storage requirements can still be very large and onerous.

Figure 2:
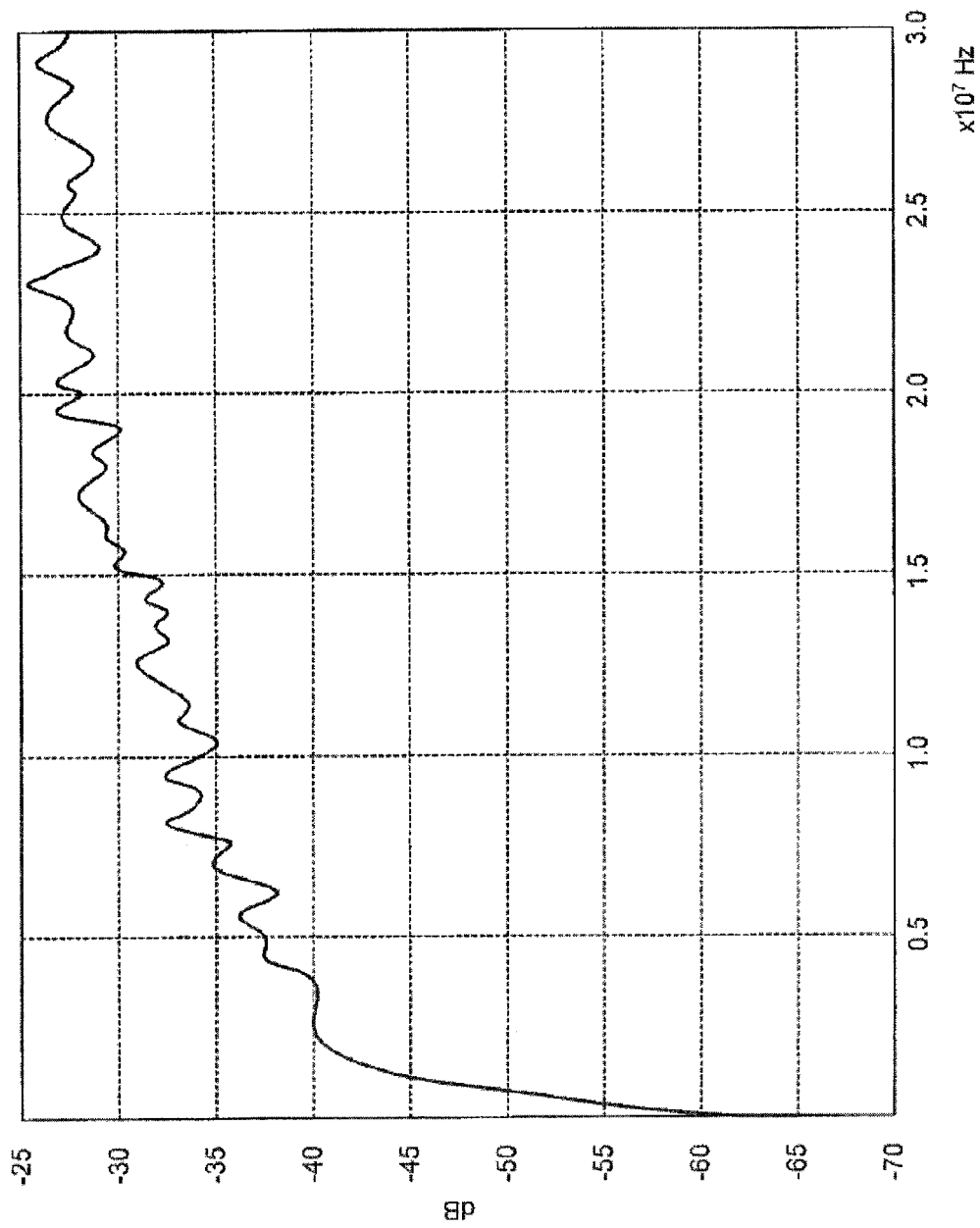
FIG. 2 is a typical FEXT channel response from 0 to 30 MHz from a telco binder cable.

As noted above, measurements on DSL cables show that the incremental change between adjacent tones' FEXT coefficients is small. This does not imply that FEXT is approximately constant across all tones, but rather that FEXT changes relatively smoothly from one tone to the next. For example, FIG. 2 shows an exemplary FEXT channel response curve from 0 to 30 MHz from a telco binder cable. Sub-channel spacing in DMT-based DSL systems is typically on the order of 4 to 8 kHz. As can be seen, incremental changes in FEXT between nearby sub-channels is relatively small even though there is large variation over the complete 0 to 30 MHz band. In most FEXT cancellation schemes, the goal is a combined system in which the relationship between system inputs x and system outputs y is defined for downstream vectoring as y=HGx+n, where G is pre-applied to input data, where the matrix product HG approximates a diagonal matrix, where H is a matrix containing the MIMO system transmission data values $H_{ij}$ discussed above, where G is a matrix of FEXT pre-canceller coefficients $G_{ij}$ derived by the system, and where n is noise (or other uncorrelated distortion sources in the channel or electronics). For upstream vectoring, FEXT compensation is implemented as a post-canceller and y=G(Hx+n). For either downstream or upstream vectoring, one method for deriving G with full precision (i.e., calculating each full precision coefficient value of $G_{ij}$) utilizes the matrix inverse, so that if the FEXT coefficient between user i and user j at tone k is $H_{ij}(k)$, the pre-canceller or post-canceller coefficient is $G_{ij}(k)=H_{ij}^{-1}(k)$. As appreciated by those skilled in the art, there are other methods to compute these crosstalk cancellation coefficients. However, incremental change from $H_{ij}(k)$ to $H_{ij}(k+1)$ is small and some reduced-memory vectored DSL embodiments herein exploit the minor incremental variations of $G_{ij}(k)$ in consecutive tones. Exemplary embodiments provided in connection with downstream vectoring and a CPE providing downstream FEXT data (i.e., error signals collected by the CPE and sent upstream to the DSLAM for processing) can be applied equally to upstream vectoring, where the CPEs of a given group send test signal input data upstream to the DSLAM (upstream-end device) to generate FEXT data relating to upstream transmissions. The only material difference is that the benefits of reduced-memory transmissions to reduce upstream bandwidth usage are less relevant because the FEXT error signals are received, observed, measured and/or collected by the DSLAM (or other upstream-end device) rather than the CPE modems.

A practical exemplary vectored DSL system can have 128 users using 2,500 tones, leading to 32 cancellation coefficients per user (32 most significant FEXT sources for each user). Such a system operating with full precision for calculating and implementing inverse matrix G requires storage of 10 million coefficients, each requiring approximately 20-32 bits. As appreciated by those skilled in the art, materially reducing bandwidth and memory to store, transmit and process coefficients in such a system represents a substantial benefit. Total memory storage capacity/size in DSLAM side equipment is a concern; but coefficient memory bandwidth may be an even bigger concern. If this system uses a 4 kHz DMT symbol rate, 40 Giga-words of memory bandwidth are required (each coefficient must be loaded for each DMT symbol). The two storage options—on-chip and off-chip memory—both have drawbacks that negatively affect performance. For an exemplary memory requirement of 40 MB, on-chip memory for ASIC or FPGA implementations is very expensive in die size (ASIC) or simply not available (FPGA). This exemplary memory amount is possible with off-chip commodity DRAM, however the bandwidth of the channel between the memory and the vector processor is too slow to support vectoring (the entire content of the memory must be read in the 250 microsecond duration of each DMT symbol).

According to certain aspects, embodiments of the invention yield (1) a vectored DSL system that imposes less of a bandwidth burden for data transmission from CPE crosstalk data collectors to DSLAMs, and/or (2) a vectored DSL system with improved data storage, transmission and processing requirements at the DSLAM side for crosstalk cancellation coefficients and/or other FEXT cancellation data.

In some embodiments one or more microbands are defined within a "full set" of DSL tones (e.g., all tones used in a DSL system, all downstream tones used, all upstream tones used, a number of downstream or upstream frequency bands (each of which has a full set of tones), etc.). When "all tones" are referred to herein, this phrase is to be interpreted as "substantially all tones" because a minimal number of tones in a given range, especially a large frequency range, might not be involved in data transmission. Each microband can have an equal number of tones or not (e.g., number or spacing of tones in a microband may change based on frequency band position). Higher frequencies suffer from different FEXT problems than lower frequencies, so smaller microband sizes in high frequency ranges might be used; other variations will be apparent to those skilled in the art. In simple examples, some embodiments divide the full set of DSL tones (e.g., 256 or 4,094 tones in an entire system, or all tones in a given frequency band) into microbands that each contain the same number of tones. Using a small number of full-precision values for $G_{ij}(k)$ in each microband, $G_{ij}(k)$ values for the remaining tones can be approximated. Careful selection of an approximation model thus reduces back-channel communication and memory storage demands in such vectored DSL system. While $G_{ij}(k)$ is used as the exemplary quantity for determining full-precision and approximation values, other FEXT-related quantities/values (e.g., $H_{ij}(k)$, a DSL line output error signal at a modem) can be used.

Vectoring modems exchange real-time FEXT information with other modems in the vectored group (same or multiple chassis units). Using a typical DMT symbol rate in the range of 4 kHz to 8 kHz, FEXT cancellation must be done over the vectored bandwidth once per DMT symbol with a processing delay on the order of a few DMT symbols (or less) to avoid latency problems, creating a complex data network in which each line card shares real-time FEXT information from each of its modems with each of the other system modems (e.g., on other line cards, chassis, etc.). In a typical DSLAM system, the transfer of vectoring data can be tens of gigabits per second. Current DSLAM backplanes cannot handle this additional transfer load, and future DSLAM backplanes need a practical method for managing this data transfer flow with reasonable complexity and operational performance. Significant FEXT coupling can come from adjacent binders or even different cables that terminate in the same telco node due to use of a "cross box" or patch panel in the telco node. These patch panels are used to map individual copper pairs (possibly from different binders or telco cables) to specific modem ports on the DSLAM line cards. Also, when a single modem port cannot provide the desired data rate, bonding multiple modem ports together can increase a customer data rate (with a second port added to provide additional services—the multi-port DSL service has the potential to carry more data, operate at faster speeds, etc.). Some systems require bonded modem ports to be connected to the same line card; this is impractical for some telcos for the same reasons that binder group management is impractical. Finally, the computational demands of DSL vectoring—especially real-time crosstalk data processing with user data signals—create data transmission bottlenecks and processing problems. The large volume of data needs to be processed quickly (to reduce latency/delays), and must be efficiently transmitted and processed. Embodiments provide systems, apparatus, methods, etc. that efficiently handle and process these large amounts of data with little negative effect on the latency and/or performance of the DSL lines being vectored.

A vectored DSL system and measurements therein suffer from inherent noise, and errors in estimated FEXT data degrade system performance. Noise effects can be mitigated by time-averaging (many measurements made of the same quantity); if noise corrupting measurements is statistically stationary, then measurements can be more precise, though this takes more time. A collection of data smoothing (e.g., de-noising) techniques remove noise effects without requiring extra time for noise-averaging. Limited time for collecting channel measurements also means that estimates are available only on a limited subset of tones used for transmission (e.g., using estimates on one in four tones). The complete precoder/cancellation coefficient set for every tone in use must be derived from this limited measurement set. Sub-sampling (or decimation) of estimated coupling functions can bring them to a rate compatible with precoder/cancellation apparatus. High precision knowledge of FEXT data is desirable, but there is a limit to those benefits and indeed higher precision data requires more storage memory. It is beneficial to retain only as much precision as is needed to get the quantization error below a certain threshold to provide adequate system performance and the least possible memory. Uniformly spaced quantization using a quantization interval that varies according to the tone frequency or microband is used in some embodiments to control loss in a Signal to Quantization Error Ratio relative to noise (background, thermal or other unavoidable system noise).

A linear prediction filter can extract or define the correlation in the FEXT coupling (or, e.g., precoder/cancellation coefficients), and the computation of the error sequence between the prediction filter output and the actual or estimated FEXT coupling as a way to reduce the mean absolute value of the integers representing the FEXT coupling (or precoder/cancellation coefficients). Alternatively, quantized FEXT data for one disturber/victim pair can be transformed using the Discrete Cosine Transform. The absolute values of the transformed sequence are compared to a threshold and values of the transformed sequence are discarded if their absolute value is less than the threshold, and retained otherwise.

Variable-length entropy coding (e.g.; arithmetic, Huffman or Golomb coding) can further compress FEXT data and be used with subsampling, quantization and prediction. Adjustable parameters to control information loss can be initialized with more loss to ensure that compressed FEXT data fits into available memory; estimates then are successively refined to reduce the error until the memory usage reaches a pre-determined threshold. Compressed FEXT data can be updated when the prediction error is computed using additive updates to the previous set of decompressed FEXT data, the result then being encoded and stored as the new set of FEXT data. Using one or more of these approaches, techniques, etc. alone or together can reduce or eliminate communication bottlenecks that otherwise confront vectored DSL systems. Such embodiments are scalable, from small port-count systems (e.g., a single line card system) up to much larger systems (e.g., thousands of ports spread across multiple line cards and/or chassis). Such embodiments work with both optical interconnect technologies (in the case of multiple chassis systems or line card upgrades to legacy chassis equipment) and also with future copper interconnect technologies in which all communications flow within a single DSLAM on a copper backplane or using high bandwidth copper interconnect. Embodiments also permit "virtual bonding" that allows telcos to virtually bond modem ports across multiple line cards and/or multiple chassis.

Figure 3:
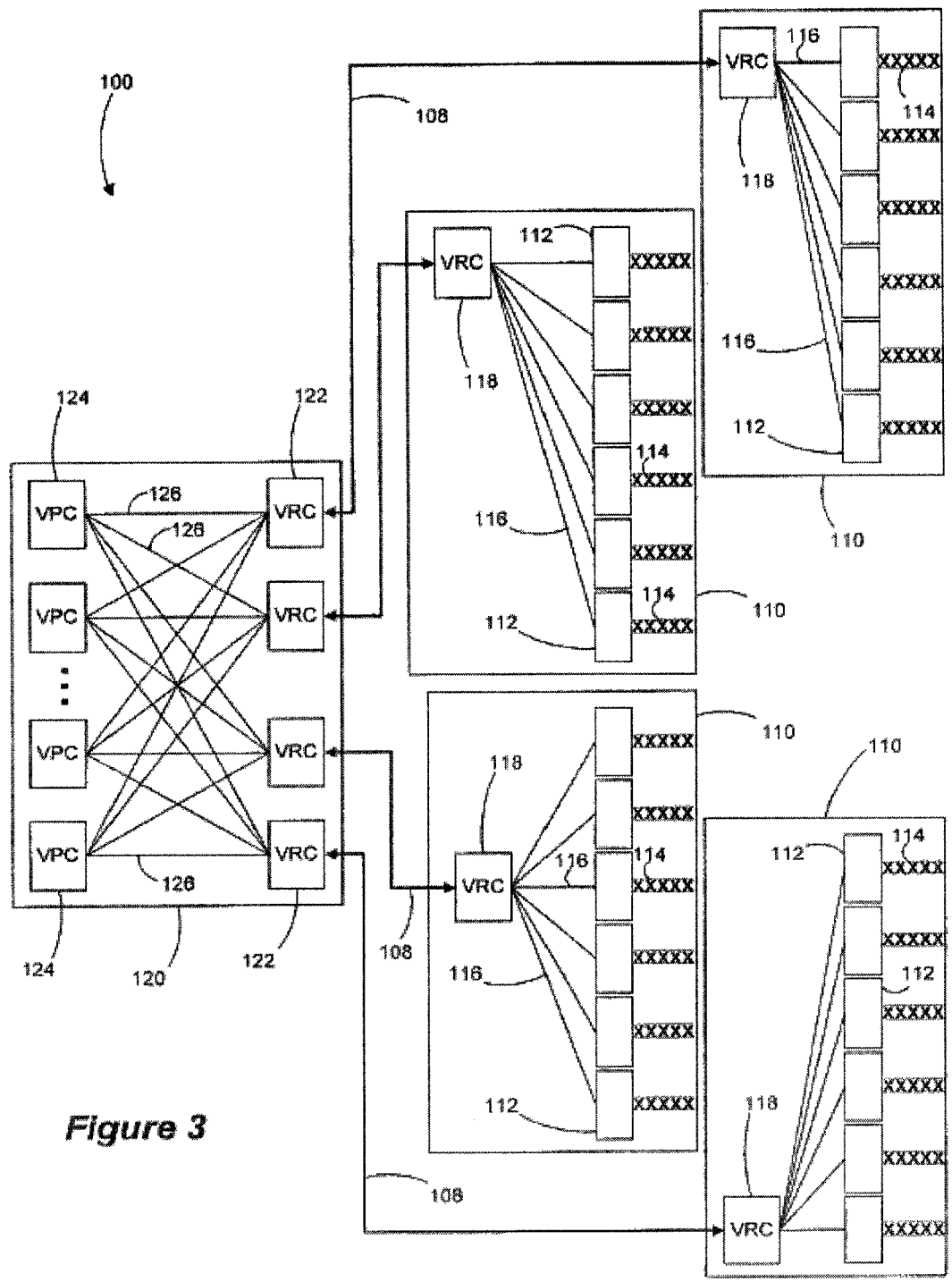
FIG. 3 is a block diagram of a vectored DSL system according to one or more embodiments of the present invention.

FIG. 3 illustrates a vectoring data communication system 100 in which line cards 110 contain DSL modems 112 (for example, multi-port devices) that control communications on twisted-pair lines 114. Multiple line cards 110 are connected via a high speed communication apparatus, such as XAUI lines 108 or the like in FIG. 3 to a vectoring control entity (VCE) that can be or include centralized vectoring module 120 (which can be, for example, a vectoring card). High-speed data communication lines 116 connect modems 112 to line card vector router components (VRC-Ls) 118. VRC-Ls 118 form an abstraction layer for modem 112, as modem 112 needs to connect to only one VRC-L 118 and the complexity of the specific vectoring deployment (e.g., number of ports, line cards, etc.) is thus hidden from each modem 112.

The vectoring data flow from each modem 112 to its respective VRC-L 118 includes frequency domain samples for downstream and upstream communications—that is, IFFT-input transmit (TX) data for downstream vectoring and/or FFT-output receive (RX) data for upstream vectoring. The data returned to each modem 112 from vectoring module 120 via a VRC-L 118 is the modem's crosstalk-adjusted (vectored) IFFT-input and/or FFT-output data that is conditioned and/or processed to prevent and/or remove crosstalk interference from other vddg lines. The VRC-L 118 in each line card 110 acts as an interface between that line card's modems 112 and vectoring module 120. High-speed lines 108 network a VRC-L 118 on each line card 110 to a companion VRC-V 122 on vectoring module 120. The VRC-Vs 122 on vectoring module 120 subdivide the modem vectoring data stream into microbands for subsequent crosstalk cancellation in one or more vector processors (VPCs) 124, as defined by system requirements. The vector processors may also be referred to as "vector processor components," "computational devices" and/or the like. That is, data is removed from a normal (i.e., non-vectored) data stream in each modem and is reorganized into data bundles defined by frequency characteristics so that the data can be crosstalk-processed on a frequency basis (for example, tone-by-tone, groups of tones, etc.). Once processed, the data is again reorganized from the frequency-based bundles used for crosstalk-removal processing and is reassembled for transmission/use by the modems.

For example, upstream and downstream bands can be vector routed by one or more VRCs (e.g., a VRC-L/VRC-V pair) to individual VPCs. A vector router is a specialized data networking device or subsystem that implements a specialized "private" data network, which can be similar to an Ethernet network, for the purpose of efficiently moving vectoring data between modems and vector processors to avoid processing or data transmission bottlenecks. Packets of vectoring data can contain headers and/or other state information enabling efficient routing of the vectoring data over the data network without the need for dedicated links between each modem and vector processor device. To this end, a vector router also converts vector data packets from a format readily supplied by the modems into a format that is naturally utilized by the vector processors, then converting back again after vectoring has been performed (for example, interleaving and de-interleaving of the modem vectoring data stream). This task may be split between VRC-Ls and VRC-Vs, or performed in only one or the other, depending on the configuration. Alternately, VPC assignment can be based on evenly spaced microbands (independent of upstream and downstream band allocation). Data transmission between VRC-Vs 122 and VPCs 124 on the vectoring module 120 can be performed using high speed interconnect lines 126.

Embodiments of the invention can be implemented in conjunction with various coefficient compression techniques disclosed in the co-pending applications. For example, these compression techniques include decimating the coefficient by tones and performing interpolation using difference coding techniques such as Golomb coding. These compression techniques further include quantization of coefficients.

The present inventor recognizes that in compressing the precoder coefficients using the techniques of the co-pending application, the choice of Golomb and quantization parameters for various frequency bands can have substantial impacts on performance. Embodiments of the invention use a unique set of Golomb modulus parameters $M_i$ and quantization level parameters $k_i$ for each macroband i. In contrast to the microbands of the co-pending application, and is appreciated by those skilled in the art, macrobands are contiguous groups of tones used for upstream and downstream transmissions (e.g. around 500-800 contiguous tones all commonly used for either upstream or downstream transmissions), and are typically set by operators. The overall constraint is that the compressed coefficients for all macrobands cannot exceed the available memory allocated for storing the coefficient data.

The total available memory allocated for coefficient storage is T. In one non-limiting example, $T=2^{17}$ bits organized as 128 1024-bit words for a single victim, 127 disturbers and 1024 tones. Note that this memory needs to be able to store compressed coefficients for all of the macrobands.

Given an available amount of $T_i$ bits of memory allocated to a given macroband one possible approach to choosing compression parameters for the macroband is to simply start with the minimum quantization parameter $k_i$, and find the best Golomb parameter $M_i$ for that quantization. Then the quantization level is increased as needed to reduce the amount of storage needed for the compressed coefficients down to $T_i$. Even with this simple approach to choosing $k_i$ and $M_i$ for a given macroband i, however, it is not clear how to choose the $T_i$ for a given macroband. In one example, the overall memory size T is just divided equally among the macrobands for simplicity. The present inventor recognized that while this simple approach works, it is not necessarily the best solution in terms of overall system data rate.

According to certain aspects, embodiments of the invention select compression parameters to optimize the data rate sent over the entire transmission spectrum (both upstream (US) and downstream (DS)) for a given channel condition. That is, the respective values of $T_i$ for the macrobands are not fixed a priori. Rather, the amount of memory $T_i$ allocated to each macroband (as specified by coefficient compression parameters for each macroband) is chosen to maximize the data rate for a current channel condition. Nevertheless, embodiments of the invention always respect the total memory constraint: $\Sigma T_i < T$.

Of course, this approach involves more complexity, and in fact, it involves solving a very complex optimization problem. However, the present inventor has recognized that while this problem can be very complex, it is mathematically convex, and thus tractable. Accordingly, embodiments of the invention provide a way to solve the problem, including perhaps processing performed offline (i.e. in computing systems different than those performing vectored DSL communications). In such offline embodiments, the results can be stored in a lookup table whose size can easily fit in memories used by conventional VCE chips (e.g. the DDR memories for Kraken and Micro VCE chips). So embodiments of the invention achieve throughput benefits with manageable complexity.

Figure 4:
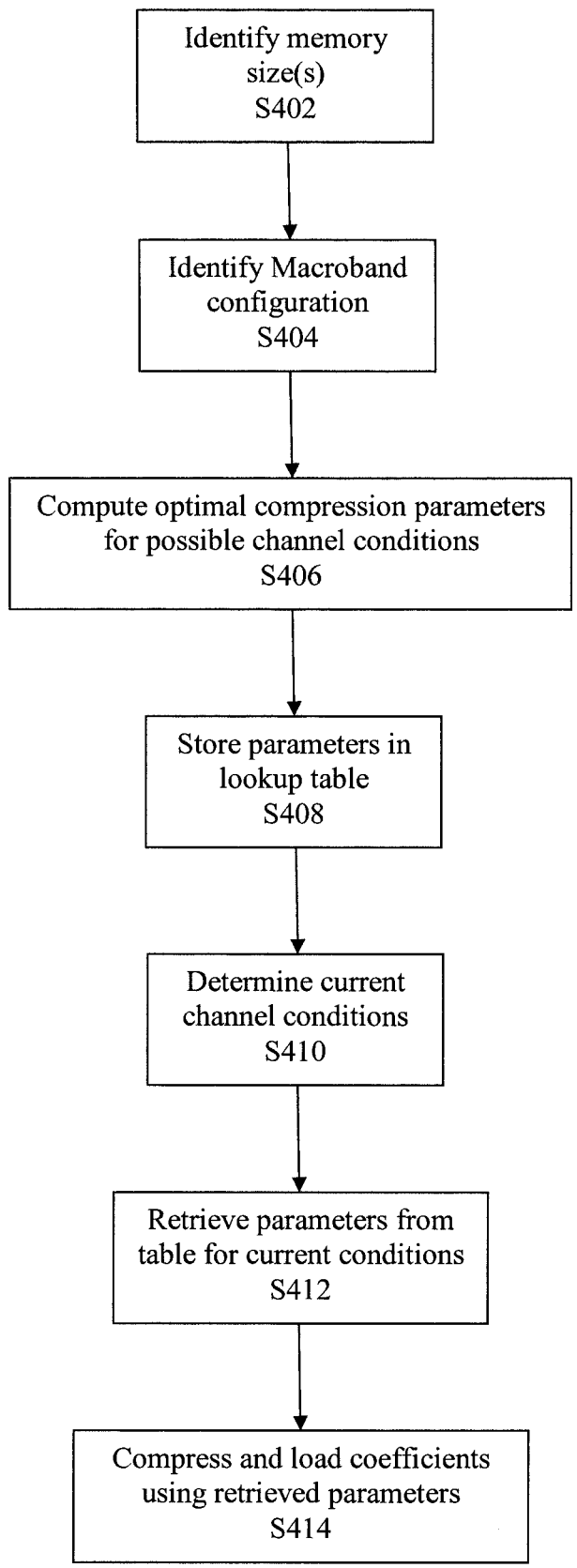
FIG. 4 is a flowchart of an example methodology of obtaining optimal compression parameters for a vectored DSL system according to embodiments of the invention.

An example method of selecting compression parameters according to embodiments of the invention is illustrated in FIG. 4.

In a first step S402, the size of the memory available for coefficient storage (T) is determined. In offline embodiments such as that shown in FIG. 4, the available size of the memory available for the compression parameter lookup table is also identified. Although this step is shown for clarity of the invention, the memory size(s) may be known or fixed, depending on the vectoring equipment used and/or the particular configuration (e.g. chips per line, etc.) used for vectoring.

In step S404, the number i of macrobands to be used, as well as the sets of tones included in each, are identified. Although this step is shown for clarity, these macrobands may be fixed and known a priori (e.g. five macrobands DS1, US1, DS2, US2 and DS3). For example, bandplans are mandated by industry standards bodies, so for a particular deployment, the macroband definitions will be predetermined.

In step S406, given the size of the memory T, a set of compression parameters for each macroband i is found by finding the compression parameters that will thereby define the amount of memory $T_i$ for each macroband and optimize the system data rate across the entire transmission spectrum. In alternative embodiments, the data rates for upstream and downstream macrobands are optimized separately. In one possible example described in more detail below, the compression parameters for each macroband i include Golomb coding parameter $M_i$ and quantization level parameter $k_i$. However, the invention is not limited to this particular example, and those skilled in the art will understand how to implement aspects of the invention using additional or alternative compression parameters.

For offline embodiments shown in FIG. 4, the optimum compression parameters for each macroband are computed for various possible channel conditions and stored in a lookup table in step S408. This step S408 also includes quantizing the channel conditions and compression parameters so that the lookup table will fit in a predetermined size of memory as determined in step S402. It should be noted that in some embodiments, steps S402 to S408 can be done offline before a system is deployed, or when a system needs to be updated, and thereafter the lookup table is fixed for the following steps.

In step S410, at appropriate times when coefficients need to be computed and/or loaded (e.g. at system startup and periodically thereafter for updates as described further below), the current channel conditions are determined. In one example offline embodiment, the channel conditions used for a lookup table are represented by two parameters: electrical length and variation in channel coefficients. The electrical length can be estimated from the information required for upstream power backoff. The variation in channel coefficients can be computed as the sum of mapped differences for one victim, all disturbers and all tones in all macrobands during preprocessing. It should be noted that the invention is not limited to this particular example of channel condition parameters, and those skilled in the art will understand how to implement aspects of the invention using additional or alternative channel condition parameters.

To be an effective FEXT canceller or precoder, coefficients should reflect the apparent state (as perceived by the modem) of the physical loop plant, which can vary with time. To accomplish this, channel measurements are made from time to time using special symbols, and additive updates to the coefficients are computed (updates are added to previous coefficients to create new coefficients for given disturber/victim pairs and tone frequencies). For example, certain industry standards specify that synchronization symbols are sent periodically between sets of data symbols. These symbols are used to update channel estimates, and hence the precoder/canceller coefficients.

In step S412, the determined current channel conditions are used to lookup the optimum set of compression parameters for the current channel conditions in the lookup table.

In step S414, using the compression parameters for each macroband from the lookup table, the coefficients are compressed and loaded into memory. The set of compression parameters is stored and when the downstream data is ready to be sent or the upstream data is received, these parameters are again used to decompress the data retrieved from memory so that vectoring can occur.

It should be noted that in online embodiments not shown in FIG. 4, that the optimum compression parameters can be computed for the currently known channel conditions in real time, and so steps S408 to S412 in FIG. 4 can be skipped.

Various possible implementation details of the method illustrated in FIG. 4 will now be described in more detail.

As mentioned above, in offline embodiments of the invention, a lookup table containing the compression parameters to use is constructed. The table is parameterized by the electrical length of the cable and also a simple function characterizing the variation in channel coefficients. Given the hypothetical number of possible channel conditions, this lookup table could be huge. However, embodiments of the invention are able to fit the lookup table into the available memory of typical VCE chips without substantial compromise of solution accuracy. In embodiments, this is done by quantizing the electrical length and channel variation parameters in a very careful way. That is, only a subset of the possible parameter combinations is used, while still optimizing the net throughput of the system within a bounded degree of accuracy. The method to construct the table can be adapted to optimize the upstream and downstream throughputs individually as well.

As further mentioned above, the optimization problem to be solved by the offline process is expressed in terms of finding the Golomb modulus, M, and the number of bits to quantize, k, for each macroband so that the data rate sent over the entire transmission spectrum (DS and US) is optimized while respecting the constraint that the compressed coefficients for a single victim, all disturbers and all tones, fits a memory of size T bits.

One component of the optimization solution is to find an optimal SINR for each macroband, where SINR is the predicted performance for the macroband after quantizing and vectoring with Golomb parameters provided by the lookup table for the given channel condition. The present inventor recognizes that since the maximum bit loading is 15 b/s/Hz including the gap, there is no benefit to achieving a SINR greater than the value that yields a spectral efficiency of 15. This value is determined by the 57 dB required through information theoretic arguments and an additional 3 dB gap used to transition from information theory into a practical communication system. Thus, the SINR can be capped at 60 dB. In implementations described below, this is called the SINR cap $\Gamma$, so $\Gamma=60$ dB.

As mentioned above, the lookup table is constructed to provide compression parameters for various channel conditions. Accordingly the various possible channel conditions (e.g. SNRs for each macroband of a given operator) need to be provided as inputs to the optimization algorithm. Embodiments of the invention use one representative SNR per macroband. For example, this representative SNR can be obtained simply by taking the average measured across the tones in the macroband or an estimate of it. Accordingly, the power mask (e.g. from a precomp table) applied at each tone for each line needs to be known.

The optimization algorithm can be run at the CO so it is reasonable to assume that all the US SNRs are known. The present inventor has recognized that there is a way to learn the DS SNRs as well. For example, for the frequencies of interest, the channel response is well determined by the electrical length—which is approximately constant—and the power mark (precomp table). The US SNR implies the electric length so from it and the power mask, the DS SNRs can be inferred.

One object of the optimization algorithm is to find the compression parameters that will cause the compressed coefficients will fit into the memory of size T. With Golomb encoding N mapped differences (m) with quantization parameters k (i.e. number of least significant bits to be quantized) and D (defined as $2^{**}(k+\log_2 M)$, where M is the Golomb modulus), the memory occupied by the compressed coefficients is:

$$\frac{8}{7}\sum_{j=1}^{N}\frac{m_j}{D} + \frac{2^{k-1}}{D} + N(1+\log 2D - k)$$

Noting that $2k<D$ and substituting $\beta=\log 2D$ yields $$\frac{8}{7}\sum_{j=1}^{N}\frac{m_j}{2^\beta} + \frac{1}{2} + N(1+\beta-k)$$

The Golomb encoded coefficient data for one victim, one disturber, all sampled tones in one macroband i, is thus upper bounded by $$\frac{8}{7}\sum_{j=1}^{\frac{2S_i}{f_{sub,r}}}\frac{m_j}{2^{\beta_i}} + \frac{1}{2} + \frac{2S_i}{f_{sub,r}}(1+\beta_i-k_i)$$

Where $S_i$ is the number of tones in the macroband i and $f_{sub,r}$ is the downsampling rate. For example, $f_{sub,r}$ equals 4 when coefficients are updated every fourth tone.

To find the length for one victim, all disturbers, and all sampled tones in macroband i, embodiments of the invention insure that the above bounds holds for the mapped differences corresponding to a single string of differenced data. When there are multiple disturbers, their data is differenced across frequency independently of each other. Thus, the ½ term stemming from residual quantization error accumulates across the disturbers and the following expression applies:

$$\frac{8}{7}\sum_{j=1}^{V_i}\frac{m_j}{2^{\beta_i}} + \frac{N_d}{2} + V_i(1+\beta_i-k_i)$$

Where $V_i$ (equals $2S_iN_d/f_{sub,r}$, where $N_d$ is the number of disturbers) is the number of values to be encoded for one victim, all disturbers, and all tones in macroband i.

Thus, the total length of the compressed coefficients over all macrobands (where $N_b$ is the number of macrobands and $\Sigma_i$ is the sum of mapped differences in; for all values $V_i$) is C as:

$$\frac{N_b N_d}{2} + \frac{8}{7}\sum_{i=1}^{N_b}\left(\sum 2^{**}\beta_i + V_i(1+\beta_i-k_i)\right)$$

Another component of the optimization algorithm includes developing a formula for SINR. In connection with this part of the algorithm, on a particular tone, the received signal on each line is represented by the vector Y and the transmitted signal by the vector X. The diagonal matrix with entry (i,i) denoting the gain of the direct channel of line i is denoted by $H_d$. Including the effects of crosstalk denoted by matrix C, the overall transfer is $H_d(I+C)$ where $H_d$ is diagonal and C has zeros along its diagonal. The precoder is thus denoted as $I-\hat{C}$ and the noise at the receiver is the i.i.d. vector N with power $N_0$.

The transmitted signal X consists of an i.i.d. unit power vector R multiplied by the values in the precomp table: the power spectral mask $A_d$ and the constellation scaling factor which preserves unit power, $\acute{M}_d$. $A_d$ and $\acute{M}_d$ are diagonal matrices whose entries represent the scalings for that line. The diagonal entries of $A_d$ are denoted by $\alpha_i$. $V=\acute{M}_d R$ is unit power i.i.d. but $X=A_d V$ is not.

To derive the SINR expression, the received signal Y is represented by $$Y=H_d(I+C)(I-\hat{C})A_d V+N$$

Letting $\delta c_{ij}$ represent the difference between the true channel coefficient and the quantized channel coefficient for the i-th victim and j-th disturber, and defining $\Delta C$ as the matrix whose entries are $\delta c_{ij}$, yields $$Y\approx H_d(I+\Delta C)A_d V+N$$

Since V is i.i.d. unit power, the following expression results:

$$SINR_i = \frac{|h_i \alpha_i|^2}{N_0 + |h_i|^2 \sum_{j\neq i}|\alpha_j \delta c_{ij}|^2}$$

Where $h_i$ is the channel transfer function for line i.

Finally, embodiments of the algorithm approximate the channel error by an expression that captures its dependence on the amount of quantization, i.e. $|\delta c_{ij}|^2 \approx 2^{-(30-2ki)}$ so that above expression can be simplified as follows $$SINR_i \approx \frac{|h_i|^2|\alpha_i|^2}{N_0 + 2^{2k_i-30}|h_i|^2 \sum_{j\neq i}|\alpha_j|^2}$$

$$= \frac{SNR_i}{1 + 2^{2k_i}SNR_i 2^{-30}\frac{\sum_{j\neq i}|\alpha_j|^2}{|\alpha_i|^2}}$$

$$= \frac{SNR_i}{1 + 2^{2k_i}\gamma_i},$$

where the last line includes the following substitutions:

$$\gamma_i = SNR_i 2^{-30} \chi_i \text{ and } \chi_i = \frac{\sum_{j \neq i} |\alpha_j|^2}{|\alpha_j|^2}$$

Note that the values of $SNR_i$ and $|\alpha_i|^2$ need to be known for all lines. For the construction of the table, embodiments of the invention make the assumption that a good approximation of the SNR per macroband can be determined from the electrical length of the cable.

It should be noted that while embodiments of the algorithm include approximating the SNR per macroband to get the SINR, as this simplifies the optimization, it is also possible to evaluate the resulting rates using SNR per tone. The SNR per tone can be estimated from the electric length.

As mentioned, the optimization algorithm is performed with the constraint that the total length of the encoded coefficient data must be less than T, the total available memory. Moreover, certain hardware constraints mandate that $\eta_i = k_i - \beta_i < 4$ and $k_i \leq 16$. Finally, there are the obvious constraints that $0 \leq k_i \leq 16$ and $\eta_i \geq 0$, and $k_i$, $\eta_i$ and $\beta_i$ are all integers.

In addition, as mentioned above, there is no benefit to achieving a SINR beyond $\Gamma$, so embodiments of the invention add the constraint $$\frac{SNR_i}{1 + 2^{2k_i}\gamma_i} \leq \Gamma$$

for $SNR_i > \Gamma$, which rearranges to $$k_i \geq \frac{1}{2}\log_2\left(\frac{1}{\gamma_i}\left(\frac{SNR_i}{\Gamma} - 1\right)\right)$$

This constraint can be simplified to $$k_i \geq t_i,$$

$$t_i = \begin{cases} \frac{1}{2}\log_2\left(\frac{1}{\gamma_i}\left(\frac{SNR_i}{\Gamma} - 1\right)\right) & \text{if } SNR_i \geq \Gamma \\ 0 & \text{else.} \end{cases}$$

Embodiments of the algorithm solve the problem over the set of reals and then round the resulting values of $k_i$ and $\eta_i$ to the nearest valid integers. It can be shown that a solution always exists that obeys these constraints since it is always possible to quantize aggressively (i.e. increase k within the allowed range) enough so that the memory constraint is respected with $\eta_i = 0$. In other words, there is always at least one point in the feasibility region.

The objective of the optimization algorithm is to solve:

$$\min_{\{k_i, \beta_i\}} \sum_{i=1}^{N_b} S_i \log_2\left(\frac{SNR_i}{1 + 2^{2k_i}\gamma_i}\right)$$

$$\text{subject to } \sum_{i=1}^{N_b}\left(\frac{8}{7}\sum_i 2^{-\beta_i} + V_i(\beta_i - k_i)\right) \leq T'$$

$$t_i \leq k_i \leq 16$$

$$k_i \leq \beta_i \leq k_i + 4.$$

The same solution is obtained if the objective is modified to be $$\min_{\{k_i, \beta_i\}} \sum_{i=1}^{N_b} S_i \log_2(1 + 2^{2k_i}\gamma_i)$$

Embodiments of the algorithm use a barrier method to solve the problem numerically. To ensure convergence, the algorithm adds extra constraints to ensure that the problem is strongly convex. It should be clear that these constraints will not change the solution of the original problem. In particular, example embodiments add the constraints (1):

$$k_i^2 \leq 17^2 = 289 \text{ and } \beta_i^2 \leq 22^2 = 484$$

It should be clear to those skilled in the art that the optimal $k_i$ and $p_i$ values lie within the constrained set.

The use of a barrier method changes the problem from a constrained optimization (i.e. there are constraints on the search space) to an unconstrained optimization by using logarithmic barrier functions to enforce the constraint. The additional constraints (1) ensure convergence because they force the second derivative to be greater than some nonnegative constant. See generally, S. Boyd and L. Vandenberg, "Convex Optimization," Cambridge University Press, 2004.

The sensitivity of the barrier is encapsulated by the parameter $t_{bar}$ as follows. The method optimizes:

$$\min_{\{k_i, \beta_i\}} \sum_{i=1}^{N_b} t_{bar} S_i \log_2(1 + 2^{2k_i}\gamma_i) - \log(16 - k_i) -$$

$$\log(k_i - t_i) - \log(\beta_i - k_i) - \log(k_i - \beta_i + 4) - \log(-k_i^2 + 289) -$$

$$\log(-\beta_i^2 + 484) - \log\left(T' - \sum_{i=1}^{N_b}\left(\frac{8}{7}\sum_i 2^{-\beta_i} + V_i(\beta_i - k_i)\right)\right).$$

Embodiments of the algorithm start with an arbitrary value of $t_{bar}$ and approximate the solution numerically to a tolerance of tolbar. Then $t_{bar}$ is increased to improve the accuracy of the solution with the original problem. However, based on certain bounds to optimality, $t_{bar} = 1$ is reasonably accurate.

For a particular value of $t_{bar}$, embodiments of the algorithm solve the problem using a gradient descent method with backtracking line search. That is, the search direction is the negative gradient of the objective and the step size is determined using a backtracking line search.

Embodiments of the invention solve the optimization by setting $t_{bar}$, $t_{back}$, $\alpha$ and $\beta$ to fixed values and performing an iterative search, where the search direction depends on the gradient of the objective. The gradient can be expressed as follows:

$$\frac{\partial}{\partial k_i}\text{objective} = t_{bar}\frac{S_i 2\gamma_i 2^{2k_i}}{1 + \gamma_i 2^{2k_i}} - \frac{1}{k_i} + \frac{1}{16 - k_i} - \frac{1}{k_i - t_i} + \frac{1}{\beta_i - k_i} -$$

$$\frac{1}{k_i - \beta_i + 4} - \frac{2k_i}{k_i^2 - 289} + \frac{V_i}{T' - \sum_{i=1}^{N_b}\left(\frac{8}{7}\sum_i 2^{-\beta_i} + V_i(\beta_i - k_i)\right)}$$

$$\frac{\partial}{\partial \beta_i}\text{objective} = -\frac{1}{\beta_i - k_i} + \frac{1}{k_i - \beta_i + 4} - \frac{2\beta_i}{\beta_i^2 - 484} +$$

-continued $$\frac{\frac{8}{7}\sum_i 2^{-\beta_i}\log 2 + V_i}{T' - \sum_{i=1}^{N_b}\left(\frac{8}{7}\sum_i 2^{-\beta_i} + V_i(\beta_i - k_i)\right)}$$

It is preferred to initialize the algorithm with a feasible point. It can be seen that setting $k_i=15$, $\beta_i=18$ for all i is feasible (though likely not optimal).

The present inventor recognizes that it is not always possible to compute the optimization solution described above for a given setup (i.e. set of loops, power mask) in real time on the vectoring hardware. As such, as mentioned above, embodiments solve the optimization offline (e.g. using Matlab code running on a laptop or desktop computer) and store the solution in a look up table that can be loaded onto a VCE chip. Since $M_i$ has five possible values (which can be encoded in 3 bits) and ki has 16 possible values (which can be encoded in 4 bits), they both can be encoded using 8 bits. So for five macrobands, for example, the lookup table would need 5 bytes per table entry to store the solution.

As also noted above, the table could potentially be huge since each macroband can have a different $\gamma_i$ based on the loop length and power mask and because the solution depends on the SNRs of the macrobands and also on the values of $\Sigma_i$ for each macroband. Accordingly, embodiments of the invention use N values to quantize each $\gamma_i$ value and M values to quantize each $\Sigma_i$, for each of the macrobands. Where there are five macrobands, there are thus (MN)×5 required table entries. Each entry in the table has the compression parameter values $\{k_i, M_i\}$ for the macroband i.

It should be noted that the power mask is generally fixed per deployment. So $SNR_i$ depends only on the electrical lengths of the various loops and this can be assumed to constant over the macrobands. So, embodiments of the invention parameterize the table by a single electrical length rather than by a group of SNRs. After assuming a standard power mask and simulating the effect of the electrical length on $\gamma_i$, embodiments of the invention restrict the electrical length to a set of just 14 values when setting the entries of the lookup table. Also, examining the impact of $\Sigma_i$ on the solution, it can be seen that this value can be quantized rather coarsely without much impact on the solution. In fact, embodiments of the invention can use just 7 values when setting entries of the lookup table, although some typical implementations use about 250 k values of electrical length and sigma.

The present inventor conducted extensive simulations to see how much of performance gain can be achieved by embodiments of the invention. The simulations compared embodiments of the invention to 1) dividing the memory equally among macrobands and 2) another reasonable choice of allocating an amount of memory to a macroband that is proportional to the size of that macroband. The present invention achieved higher data rates than either of these two schemes. For various situations, it outperforms the other schemes by more than 30%.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method performed by a processor for optimizing coefficient data for a vectored DSL system, comprising:
   identifying a plurality of macrobands in the vectored DSL system;
   selecting respective coefficient data compression parameters for each of the macrobands, wherein the coefficient data compression parameters specify parameters of one or more data compression schemes used to compress coefficient data from an original number of bits to a lower compressed non-zero number of bits;
   evaluating performance of the vectored DSL system with the selected coefficient data compression parameters; and
   optimizing the selecting of the respective coefficient data compression parameters in accordance with a desired system performance as determined by the evaluating, wherein the optimized coefficient data compression parameters of a first one of the macrobands are different than the optimized coefficient data compression parameters of a second one of the macrobands;
   storing the optimized coefficient data compression parameters in a vectoring module.

2. The method according to claim 1, further comprising:
   identifying a total available size of the coefficient data,
   wherein selecting coefficient data compression parameters is performed such that compressed coefficient data for all of the plurality of macrobands does not exceed the total available size.

3. The method according to claim 1, wherein evaluating performance includes identifying a corresponding channel condition.

4. The method according to claim 1, wherein the coefficient data compression parameters include a Golomb modulus.

5. The method according to claim 1, wherein the coefficient data compression parameters include a quantization level.

6. The method according to claim 1, further comprising:
   performing the evaluating and optimizing for a plurality of different channel conditions; and
   storing optimal coefficient data compression parameters in a lookup table indexed by the plurality of different channel conditions.

7. The method according to claim 6, further comprising:
   determining a current channel condition,
   wherein selecting includes looking up the current channel condition in the lookup table.

8. The method according to claim 6, wherein the channel conditions comprise electrical length.

9. The method according to claim 6, further comprising:
   identifying a total available size for the lookup table; and
   quantizing possible coefficient data compression parameters and channel conditions in accordance with the total available size.

10. The method according to claim 1, wherein the desired system performance is an overall maximum data rate of both upstream and downstream communications in the vectored DSL system.

11. The method according to claim 1, wherein the desired system performance is an overall maximum data rate of one of upstream and downstream communications in the vectored DSL system.

12. The method according to claim 1, further comprising:
   computing far end crosstalk (FEXT) coefficients for a current channel condition;
   compressing the FEXT coefficients using the selected coefficient data compression parameters; and
   storing the compressed FEXT coefficients.

13. The method according to claim 12, wherein compressing includes frequency decimation and difference coding.

14. The method according to claim 13, wherein the difference coding uses a Golomb modulus obtained from the selected coefficient data compression parameters.

15. The method according to claim 12, wherein compressing includes quantization.

16. The method according to claim 15, wherein the quantization uses a quantization level obtained from the selected coefficient data compression parameters.

17. The method according to claim 1, wherein each macroband consists of an upstream or downstream macroband in a DSL system bandplan.

18. The method according to claim 1, wherein the coefficient data compression parameters comprise both quantization and Golomb modulus parameters.

19. A method performed by a processor for optimizing coefficient data for a vectored DSL system, comprising:
- identifying a plurality of macrobands in the vectored DSL system;
- selecting respective coefficient data compression parameters for each of the macrobands;
- evaluating performance of the vectored DSL system with the selected coefficient data compression parameters; and
- optimizing the selecting of the respective coefficient data compression parameters in accordance with a desired system performance as determined by the evaluating;
- performing the evaluating and optimizing for a plurality of different channel conditions; and
- storing optimal coefficient data compression parameters in a lookup table indexed by the plurality of different channel conditions, wherein the channel conditions comprise a sum of mapped differences.

20. A vectored DSL system comprising:
- a vectoring control entity (VCE);
- one or more processors configured for optimizing coefficient data for the vectored DSL system, the optimizing comprising:
  - identifying a plurality of macrobands in the vectored DSL system;
  - selecting respective coefficient data compression parameters for each of the macrobands, wherein the coefficient data compression parameters specify parameters of one or more data compression schemes used to compress coefficient data from an original number of bits to a lower compressed non-zero number of bits;
  - evaluating performance of the vectored DSL system with the selected coefficient data compression parameters; and
  - optimizing the selecting of the respective coefficient data compression parameters in accordance with a desired system performance as determined by the evaluating, wherein the optimized coefficient data compression parameters of a first one of the macrobands are different than the optimized coefficient data compression parameters of a second one of the macrobands;
- storing the optimized coefficient data compression parameters in a vectoring control entity.

* * * * *

UNITED STATES PATENT AND TRADEMARK OFFICE
CERTIFICATE OF CORRECTION

| | | |
|---|---|---|
| PATENT NO. | : 9,088,350 B2 | Page 1 of 1 |
| APPLICATION NO. | : 13/552554 | |
| DATED | : July 21, 2015 | |
| INVENTOR(S) | : Pereira | |

It is certified that error appears in the above-identified patent and that said Letters Patent is hereby corrected as shown below:

In the specification

Column 6, Line 60, delete "with" and insert -- $H_{ij}$ with --, therefor.

Column 7, Line 13, delete "$H'_{ii}$," and insert -- $H_{ij}$, --, therefor.

Column 7, Line 16, delete "i≠j" and insert -- i≠j, --, therefor.

Column 10, Line 52, delete "(e.g.;" and insert -- (e.g., --, therefor.

Column 11, Line 15, delete "XAU1" and insert -- XAUI --, therefor.

Column 12, Line 37, delete "macroband" and insert -- macroband i, --, therefor.

Column 16, Line 1, delete "in;" and insert -- $m_i$ --, therefor.

Column 17, Lines 5-6, delete " $\dfrac{\sum_{j\neq i}|\alpha_j|^2}{|\alpha_j|^2}$ " and insert -- $\dfrac{\sum_{j\neq i}|\alpha_j|^2}{|\alpha_i|^2}$ --, therefor.

Column 17, Line 47, delete "ηi;" and insert -- ηi --, therefor.

Column 18, Line 6, delete " $\min_{\{k_i,\beta_i\}}$ " and insert -- $\max_{\{k_i,\beta_i\}}$ --, therefor.

Column 18, Line 18, delete "pi" and insert -- βi --, therefor.

Signed and Sealed this
Nineteenth Day of January, 2016

Michelle K. Lee
*Director of the United States Patent and Trademark Office*